(12) United States Patent
Kotzin (10) Patent No.: US 7,170,994 B2
(45) Date of Patent: Jan. 30, 2007

(54) METHOD AND APPARATUS FOR SELECTING AN ALERT MODE BASED ON USER BIOMETRICS

(75) Inventor: Michael D Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 519 days.

(21) Appl. No.: 10/686,085

(22) Filed: Oct. 15, 2003

(65) Prior Publication Data

US 2005/0084075 A1    Apr. 21, 2005

(51) Int. Cl.
*H04M 3/00* (2006.01)

(52) U.S. Cl. .............................. 379/373.01; 379/373.02

(58) Field of Classification Search ............... 379/372, 379/373.01, 373.02, 373
See application file for complete search history.

(56) References Cited

U.S. PATENT DOCUMENTS

| | | | |
|---|---|---|---|
| 3,884,218 A | 5/1975 | Monroe | 128/1 C |
| 4,228,806 A | 10/1980 | Lidow | 128/731 |
| 4,550,736 A | 11/1985 | Broughton et al. | 128/731 |
| 4,585,011 A | 4/1986 | Broughton et al. | 128/733 |
| 4,735,199 A | 4/1988 | DiLullo | 128/1 R |
| 4,832,050 A | 5/1989 | DiLullo | 128/782 |
| 4,836,219 A | 6/1989 | Hobson et al. | 128/782 |
| 4,863,259 A | 9/1989 | Schneider et al. | 351/210 |
| 5,008,865 A | 4/1991 | Shaffer et al. | 368/10 |
| 5,101,831 A | 4/1992 | Koyama et al. | 128/687 |
| 5,187,657 A | 2/1993 | Forbes | 364/413.06 |
| 5,280,791 A | 1/1994 | Lavie | 128/696 |
| 5,441,476 A | 8/1995 | Kitado et al. | 600/26 |
| 5,507,716 A | 4/1996 | LaBerge et al. | 600/27 |
| 5,551,879 A | 9/1996 | Raynie et al. | 434/236 |
| 5,772,591 A | 6/1998 | Cram | 600/383 |
| 5,825,293 A | 10/1998 | Ahmed et al. | 340/573 |
| 5,846,206 A | 12/1998 | Bader | 600/534 |
| 5,928,133 A | 7/1999 | Halyak | 600/26 |
| 5,948,303 A | 9/1999 | Larson | 219/486 |
| 6,030,342 A | 2/2000 | Amano et al. | 600/301 |
| 6,231,187 B1 | 5/2001 | Munoz et al. | 351/209 |
| 6,272,378 B1 | 8/2001 | Baumgart-Schmitt | 600/544 |

(Continued)

FOREIGN PATENT DOCUMENTS

EP    0450341 A2    4/1991

(Continued)

*Primary Examiner*—Jefferey Harold
(74) *Attorney, Agent, or Firm*—Charles W. Bethards (57) ABSTRACT

A communication apparatus includes a communication device (130) and an activity monitoring device (120). The communication device (130) includes an alert device (275) for notifying a user (110) of an incoming call. The communication device (130) further includes a controller (210) for selecting a mode of the alert device (275). The controller (210) judges, based on data from the activity monitoring device (120), whether the user can be disturbed, and, if the user (110) can be disturbed, the controller (210) selects an audible mode of the alert device (275). If the controller (210) determines that the user (110) cannot be disturbed, then the controller (210) selects a silent mode of the alert device (275). The activity monitoring device (120) produces data representing a biometric characteristic of the user (110), which is used by the controller (210) to judge whether the user (110) can be disturbed. A corresponding method (FIG. 6 and FIG. 7) selects an appropriate alert mode based user biometrics.

19 Claims, 4 Drawing Sheets

U.S. PATENT DOCUMENTS

| | | |
|---|---|---|
| 6,287,262 B1 | 9/2001 | Amano et al. ............... 600/500 |
| 6,319,205 B1 | 11/2001 | Goor et al. ................. 600/485 |
| 6,322,515 B1 | 11/2001 | Goor et al. ................. 600/485 |
| 6,352,517 B1 | 3/2002 | Flock et al. ................ 600/595 |
| 2001/0048639 A1 | 12/2001 | Davidson .................... 368/82 |
| 2002/0029000 A1 | 3/2002 | Ohsaki et al. .............. 600/500 |
| 2002/0080035 A1 | 6/2002 | Youdenko ................ 340/573.1 |
| 2003/0174049 A1* | 9/2003 | Beigel et al. ............ 340/10.42 |
| 2004/0066932 A1* | 4/2004 | Seligmann ............ 379/373.01 |

FOREIGN PATENT DOCUMENTS

| | | |
|---|---|---|
| EP | 0450341 B1 | 4/1991 |
| EP | 0652496 A1 | 5/1994 |
| EP | 0652496 B1 | 5/1994 |
| EP | 0845241 A1 | 6/1997 |
| EP | 1059575 A2 | 6/2000 |
| WO | WO 89/08423 | 9/1989 |
| WO | WO 91/09372 | 6/1991 |
| WO | WO 91/16853 | 11/1991 |
| WO | WO 93/08739 | 5/1993 |
| WO | WO 95/0001 | 1/1995 |
| WO | WO 95/33403 | 12/1995 |
| WO | WO 97/17012 | 5/1997 |
| WO | WO 97/38359 | 10/1997 |
| WO | WO 98/43536 | 10/1998 |
| WO | WO 98/49028 | 11/1998 |
| WO | WO 98/53456 | 11/1998 |
| WO | WO 00/72748 | 12/2000 |
| WO | WO 01/03751 | 1/2001 |
| WO | WO 01/06921 | 2/2001 |
| WO | WO 01/50202 | 7/2001 |
| WO | WO 01/64101 | 9/2001 |
| WO | WO 01/91631 | 12/2001 |
| WO | WO 01/95801 | 12/2001 |
| WO | WO 01/95802 | 12/2001 |
| WO | WO 01/95803 | 12/2001 |
| WO | WO 01/98842 | 12/2001 |

\* cited by examiner

METHOD AND APPARATUS FOR SELECTING AN ALERT MODE BASED ON USER BIOMETRICS

FIELD OF THE INVENTION

This invention relates in general to communication devices, such as telephones, and methods of using communication devices and, more particularly, to a communication device that selects an alert mode based on a biometric characteristic of the user and to a method of selecting an alert mode based on a biometric characteristic of a user.

BACKGROUND OF THE INVENTION

Users of communications devices, such as telephones, pagers and similar messaging devices, desire a large degree of control over others' ability to reach them. Many features have been added to such devices to add to that control, such as call forwarding, answering machines, call screening, caller ID, and filtering of incoming calls. For example, some devices may permit one to define a rule that permits business calls to reach the user during business hours or a rule that calls from a particular person are always routed to a voice mail service. However, current controls lack the ability to determine the biometric state of the user when making decisions. That is, current controls in communication devices lack the ability to determine that a user is asleep and should not be disturbed.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

The present disclosure concerns communications systems that provide services such as voice and data communications services to communications devices or units, often referred to as subscriber devices, such as cellular phones. The disclosure also concerns wired communication devices, such as telephones and personal computers.

More particularly, various inventive concepts and principles embodied in a method and apparatus for altering an alert mode based on the biometric state of the user are discussed. The communication unit can be any of a variety of wireless communication units, such as a cellular handset or equivalents thereof, or a wired communication device, such as a wired telephone or a computer.

The communication devices that are of particular interest are those that provide or facilitate voice communication services or data or messaging services, such as conventional two way systems and devices, various cellular phone systems including analog and digital cellular, CDMA (code division multiple access) and variants thereof, GSM, GPRS (General Packet Radio System), 2.5 G and 3G systems such as UMTS (Universal Mobile Telecommunication Service) systems, integrated digital enhanced networks, and variants or evolutions thereof. Similarly, the communication systems and devices can include LAN (local area network) systems that employ anyone of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures.

As further discussed below, various inventive principles and combinations thereof are advantageously employed to provide a method and apparatus for altering an alert mode based on the biometric state of the user, thus alleviating various problems associated with known communication units, provided these principles or equivalents thereof are employed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, upper and lower and the like are used solely to distinguish one from another entity or action without necessarily requiring or implying any actual such relationship or order between such entities or actions.

The terms "a" or "an" as used herein are defined as one or more than one. The term "plurality" as used herein is defined as two or more than two. The term "another" as used herein is defined as at least a second or more. The terms "including," "having" and "has" as used herein are defined as comprising (i.e., open language). The term "coupled" as used herein is defined as connected, although not necessarily directly and not necessarily mechanically.

Much of the inventive functionality and many of the inventive principles are best implemented or facilitated with or in software programs or instructions and integrated circuits (ICs) such as processor based or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the various embodiments.

Figure 1:
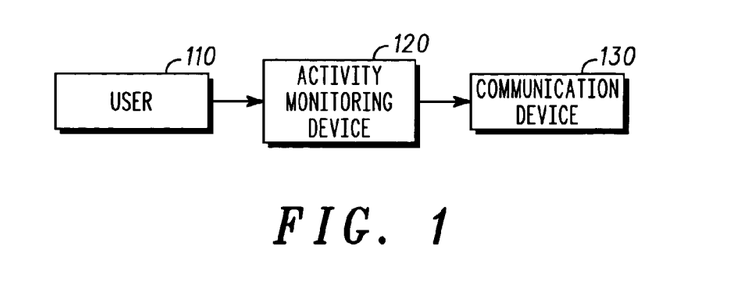
FIG. 1 is a block diagram showing a sensor, which is coupled to a communication device, monitoring a user.
Figure 2:
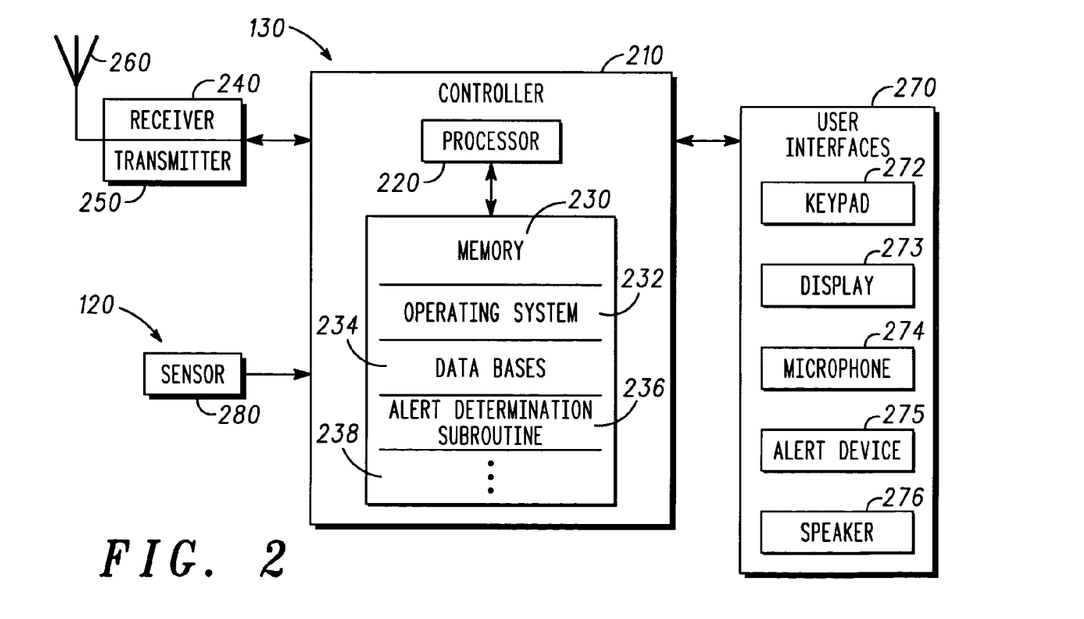
FIG. 2 is a block diagram showing a sensor coupled to an exemplary wireless communication device.

Referring to FIGS. 1 and 2, the invention is basically a communication apparatus, which includes a communication device 130 coupled to an activity monitoring device 120. Note that the activity monitoring device 120 may reside within and as a part of the communications device 130. As shown in FIG. 2, the communication device 130 includes a controller 210 and a receiver 240 coupled to the controller 210. An alert device 275 is coupled to the controller 210. The alert device 275 alerts a user 110 that the receiver 240 has received a communication. The alert device 275 has a plurality of operating modes. The activity monitoring device 120 monitors the activity of the user 110, and senses a biometric characteristic of the user 110. The controller 210 selects one of the operating modes of the alert device 275 based on the sensed biometric characteristic of the user 110. Therefore, for example, if the controller 210 determines that the user 110 is asleep, a silent mode of the alert device 275 can be selected and the user 110 will not be disturbed. The communication device 130 of FIG. 1 is, for example, a wireless communication device but is not limited to a wireless communication device. The communication device 130 of FIG. 1 can be, for example, a wired communication device, such as a wired telephone or a personal computer that alerts a user 110 when an e-mail message arrives.

In the embodiment of FIG. 2, the communication device 130 is a wireless communication device, and both a transmitter 250 and the receiver 240 are coupled to the controller 210. The communication device 130 of FIG. 2 is, for example, a cellular telephone. Thus, the alert device 275 normally alerts the user 110 audibly when a call is received. An antenna 260 is coupled to the receiver 240 and the transmitter 250.

In the embodiment of FIG. 2, the activity monitoring device 120 is a motion sensor 280, which is coupled to the controller 210. The motion sensor 280 is, for example, an infrared motion detector, such as those used conventionally in home security systems. The activity monitoring device 120 may be any type of motion sensor that monitors activity of the user 110. For example, the activity monitoring device 120 can be a sensor that monitors activity of the user 110 without contacting the user 110. Alternatively, the activity monitoring device 120 can be a heart rate sensor, wristwatch including biometric sensor, or other physical sensor that is attached directly to the user 110. For example, the sensor 280 may be a resistance sensor, for sensing electrical resistance of the user 110, a solid state accelerometer, for detecting motion of the user, or other known motion sensor. The sensor 280 may be connected to the controller 210 by a wire or by a wireless coupling such a short-range radio link. For example, the sensor 280 can be connected to the controller 210 with a wireless link, as described later in more detail.

The controller 210 includes a processor 220, which is coupled to a memory 230. The memory 230 stores an operating system 232, which, as is generally known in the art, is software for operating the controller 210, and databases 234, for storing various data required to operate the controller 210. In addition, the memory 230 stores an alert determination subroutine 236, which is described in detail later, and other routines 238 for performing various functions of the communication device 130.

A user interface 270 is coupled to the controller. The user interface 270 includes at least a keypad 272, a display 273, a microphone 274, the alert device 275, and a speaker 276. The alert device 275 can be, for example, a sound generating apparatus such as a speaker for producing an audible alert. However, the alert device 275 may produce a tactile alert. In a manner that is understood by those of ordinary skill in the art, the volume and the pattern of the sound produced by the alert device 275 can be varied, and the device can be disabled so that no sound is produced. In the embodiment of FIG. 2, the alert device 275 has at least two modes of operation. In a first mode of operation, the alert device 275 produces no audible sound. The first mode is a non-disturbing mode of the alert device 275. In the second mode, the alert device 275 produces audible sound. In the case of a tactile alert, in the first mode, no tactile alert is produced and, in the second mode, the alert device 275 produces a tactile alert. The second mode of the alert device may be put into effect by disabling the alert device 275.

Figure 6:
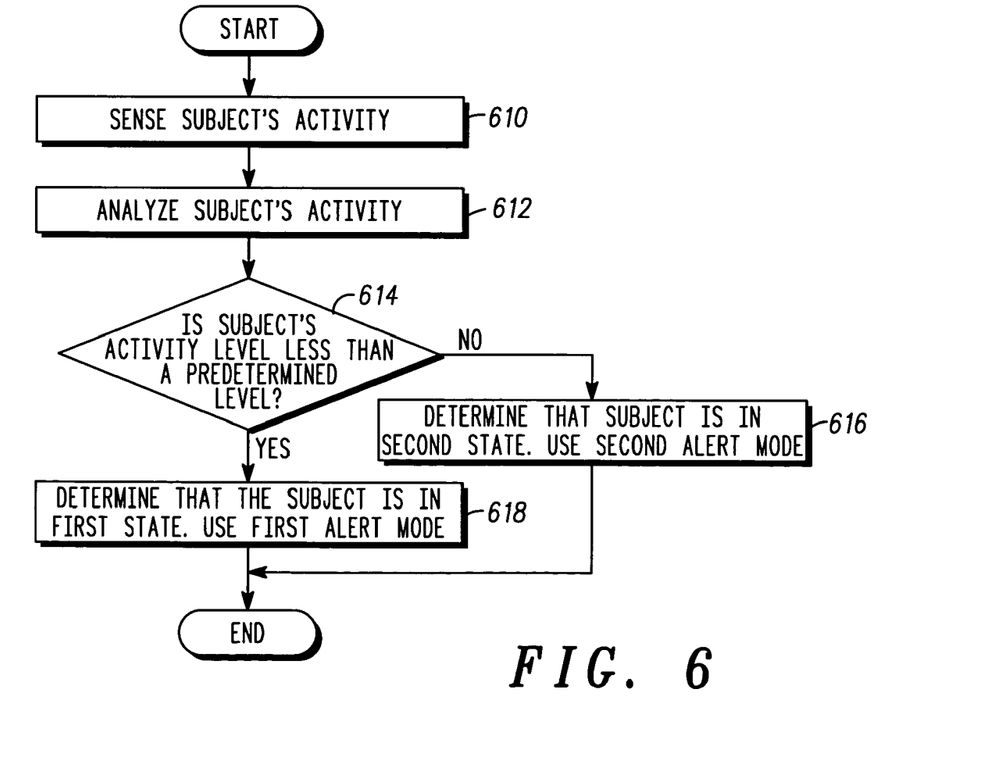
FIG. 6 is a flow chart showing an exemplary method of selecting an alert mode in a communication device.

The alert determination routine 236, which is illustrated in FIG. 6 and is discussed in detail below, determines which of the alert modes is used if an incoming call is received by the receiver 240. The sensor 280 produces signals that represent the activity level of the user 110. The processor 220 reads the signals and determines whether the activity level of the user 110 is less than a predetermined activity level. If the activity level of the user 110 is less than the predetermined activity level, the processor 220 selects the first mode, or the non-disturbing mode, of the alert device 275. That is, in one embodiment, a silent mode of the alert device 275 is selected. Otherwise, the processor 220 selects an audible or other mode of the alert device 275.

Figure 3:
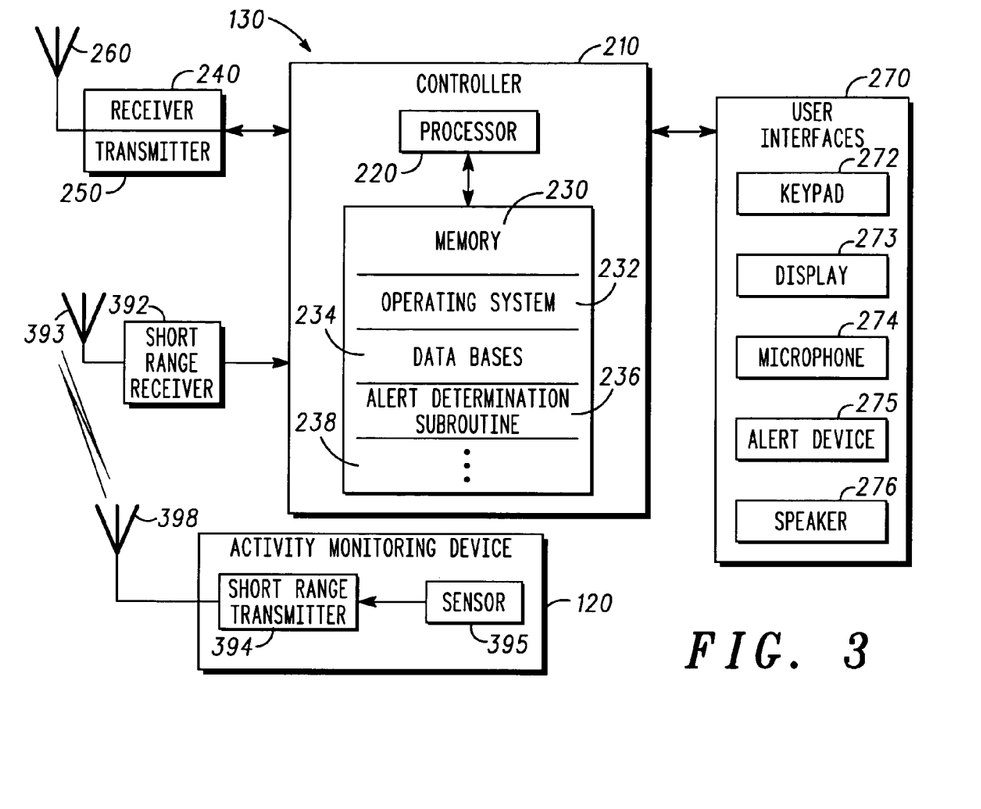
FIG. 3 is a block diagram of another embodiment showing a sensor wirelessly coupled to a wireless communication device.

FIG. 3 illustrates a further embodiment of the communication apparatus. The embodiment of FIG. 3 includes a communication device 130, which is essentially the same as that of the embodiment of FIG. 1. The embodiment of FIG. 3 differs from that of FIG. 1 in that the communication device 130 includes a short-range receiver 392 for coupling the activity monitoring device 120 to the controller 210. The activity monitoring device 120 in the embodiment of FIG. 3 includes a short-range transmitter 394 that communicates with the short-range receiver 392. The short-range wireless link formed by the short-range transmitter 394 and the short-range receiver 392 operates with a conventional communication standard such as Bluetooth.

A sensor 395 is coupled to the short-range transmitter 394. The sensor 395, like the sensor 280 of the embodiment of FIG. 2, senses the activity of the user 110. The sensor 395 can be a motion detector, such as an infrared motion detector, that can detect motion of the user 110 without contacting the user 110. However, the sensor 395 can be a sensor that is attached directly to the user 110 for sensing a physical characteristic such as heart rate. As in the embodiment of FIG. 2, the sensor 395 produces signals that represent the activity level of the user 110. The signals are transmitted by the short-range transmitter 394, which has an antenna 398, to the short-range receiver 392, which has an antenna 393. The processor 220 reads the signals from the short-range receiver 392 and determines whether the activity level of the user 110 is less than a predetermined activity level. If the activity level of the user 110 is less than the predetermined activity level, the processor 220 selects the non-disturbing mode, or the first mode, of the alert device 275. Otherwise, the processor 220 selects the second mode of the alert device 275, in which the user 110 is alerted to incoming calls.

Figure 4:
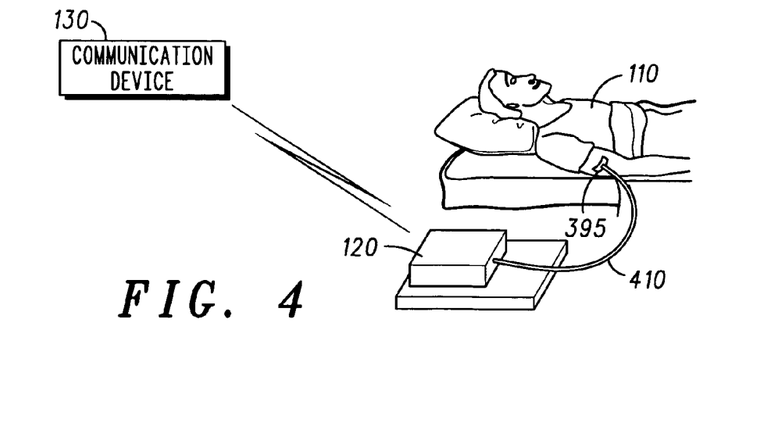
FIG. 4 is a diagram showing a communication device coupled to a biometric monitoring device, which is coupled to a user.

FIG. 4 illustrates the communication device 130 of FIG. 3 in operation when the sensor 395 of the activity monitoring device 120 is a heart rate sensor that is attached directly to the user 110. A wire 410 couples the heart rate sensor 395 to the short-range transmitter 394. Signals representing the heart rate of the user 110 are sent wirelessly to the communication device 130 with the short-range transmitter 394 and the short-range receiver 392. The signals are analyzed by the processor 220 to determine whether the activity level of the user 110 is less than a predetermined level.

Figure 5:
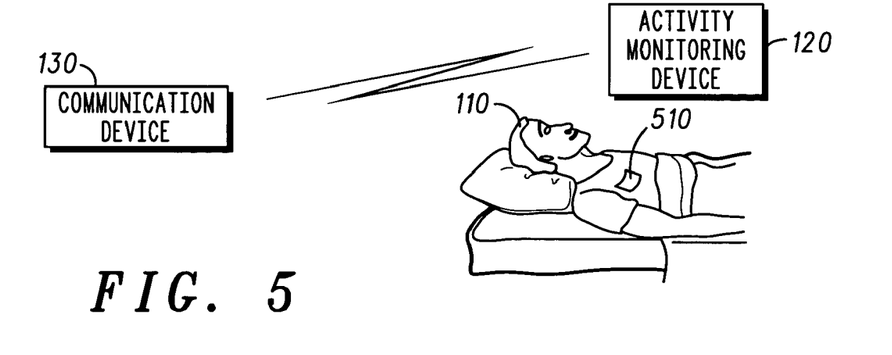
FIG. 5 is a diagram showing a communication device of a further embodiment, which is coupled to a biometric monitoring device.

FIG. 5 illustrates the communication device 130 of FIG. while in operation when the sensor 395 of the activity monitoring device 120 is a non-contacting motion sensor. A small permanent magnet 510, which has North-seeking and South-seeking poles, is attached to the clothing of the user 110. The magnet 510 is located such that is will move in accordance with the motion of the user's chest or abdomen during breathing. The magnet 510 may be held in a pouch that includes a fastener for readily attaching the magnet 510 to the user's clothing.

In the embodiment of FIG. 5, the sensor 395, which is located inside the activity monitoring device 120, as indicated in FIG. 3, is a transducer type of sensor for magnetic fields, such as a Hall effect device, a magnetostrictive transducer, a magnetic field sensitive transistor, a search coil, a fluxgate transducer, or other device for sensing and measuring magnetic field intensity. The sensor 395 provides an electrical output signal indicative of the magnetic field strength present in the immediate vicinity of the sensor 395. The sensor 395 is mounted in a relatively fixed location proximate to where the user 110 sleeps. Although not shown, the activity monitoring device 120, which includes the sensor 395, may be located beneath the bed of the user 110. This location is suggested, since it places the sensor 395 in close proximity to the magnet 510. The sensitivity required by the sensor 395 is reduced when the distance between the magnet 510 and the sensor 395 is reduced, and the lower the required sensitivity of the sensor 395, the lower the cost.

The sensor 395 provides an electrical output signal indicative of the magnetic field strength present in the immediate vicinity of the sensor 395. As the user 110 breathes, the magnet 510 will move causing the distance between the magnet 510 and the sensor 395 to vary. The output signal of the sensor 395 will have a variable component due to the motion of the magnet 510. The variable component can be separated out for further processing by using well-known techniques such as analog filtering or by analog to digital conversion and thereafter using digital filtering, such that the sensor 395 produces signals that represent the breathing of the user 110.

The signals representing the breathing of the user 110 are sent to the short-range transmitter 394 and are transmitted to the short-range receiver 392 of the communication device 130. The processor 220 reads the signals and determines whether to employ the non-disturbing mode of the alert device 275. That is, the processor 220 determines whether the user 110 is in a state of sleep and selects the first, or non-disturbing, alert mode if the user 110 is determined to be in a state of sleep.

FIG. 6 illustrates the method of selecting an alert mode in more detail in the form of an alert determination subroutine 236, which is stored in the memory 230. Initially, the activity of the user 110 is sensed at 610. At this stage, signals, which are produced by the sensor 280 of FIG. 2 or sensor 395 of FIG. 3, are read by the processor 220. At 612, the signals are analyzed to determine the activity level of the user 110. For example, if the signals represent the heart beat of the user 110, the processor 220 determines the heart rate of the user 110. At a decision 614, the processor 220 determines whether the activity level of the user 110 is less than a predetermined level. Thus, if the activity level is determined by the user's heart rate, the current heart rate is compared to a predetermined heart rate, which is determined experimentally or is taken from reference sources such as medical textbooks. The predetermined heart rate is stored, for example, in a database 234 and is used to judge, for example, whether the user 110 is sleeping. If the outcome of the decision 614 is positive, then at 618, the processor 220 determines that the user 110 is in a first state, or in a state of sleep, and the first alert mode, or a non-disturbing alert mode, is employed. That is, for example, a silent mode of the alert device 275 is selected by the processor 220 if the user 110 is considered to be sleeping. If the outcome of the decision 614 is negative, then the processor 220 determines that the user 110 is in a second state, or in a wakeful state, and a second alert mode is employed. That is, for example, an audible mode of the alert device 275 is selected by the processor 220.

The processor 220 may select the alert mode by, for example, setting a flag that is stored in a database 234 in a manner well understood by those of ordinary skill in the art. The flag is referred to by the operating system 232 of the communication device 130. That is, the state of the flag determines the current alert mode.

Although heart rate was used as an exemplary biometric characteristic in discussing the flow chart of FIG. 6, other biometrics may be employed to determine the activity level of the user 110 as is apparent from the discussion of the embodiment of FIG. 5, in which a motion detector is employed to measure chest movement. That is, the processor 220 may determine whether the user 110 is in a state of sleep based on whether the frequency of chest movement is less than a predetermined frequency. Similarly, the sensor 395 may be a conventional infrared motion detector, which is employed to produce signals representative of the user's chest or abdominal movement. Further, the sensor 395 may be a commercially available solid state accelerometer. In this case, the accelerometer is attached to the bed or the clothing of the user 110. The accelerometer may be coupled by wire or wirelessly linked to the short range transmitter 394. Output signals from the accelerometer can be used to determine the degree or frequency of physical movement of the user in the same manner as signals from other types of motion detectors.

Figure 7:
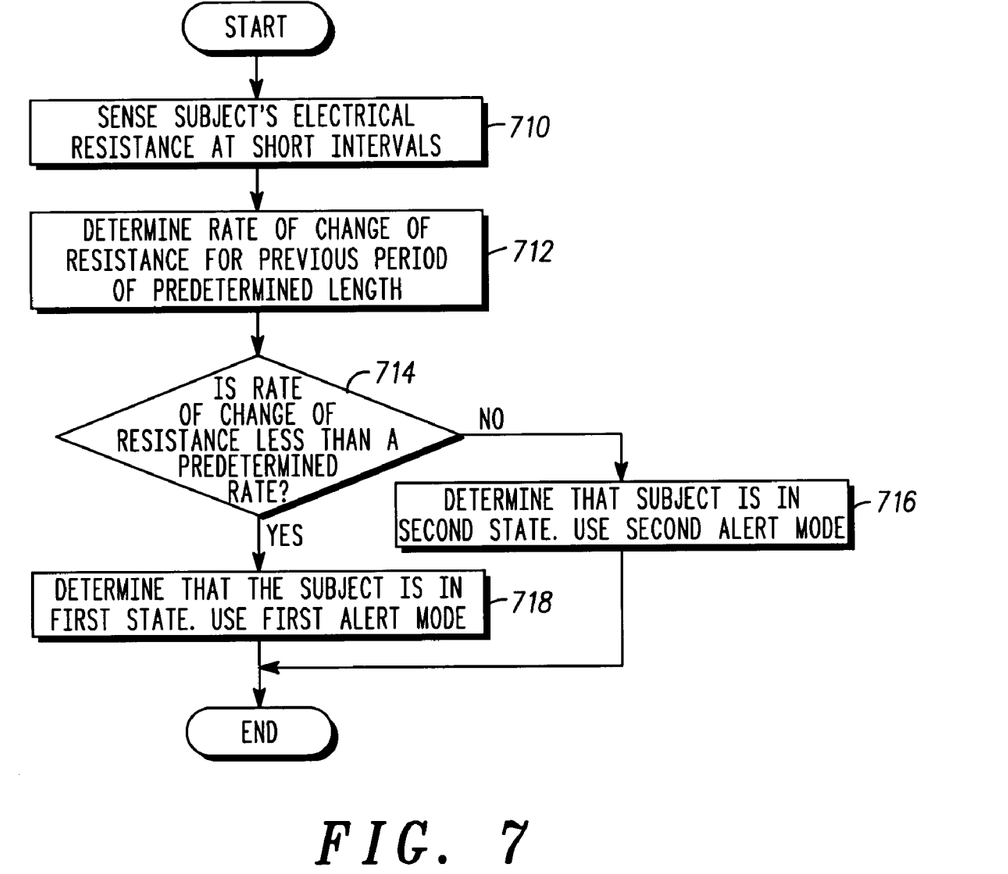
FIG. 7 is a flow chart showing a further exemplary method of selecting an alert mode in a communication device.

In a further embodiment, which may be represented by FIGS. 3 and 4 and 7, the sensor 395 includes a pair of electrodes, such as transcutaneous, electrical nerve stimulation, or TENS, electrodes, which measure the electrical resistance of the user 110. Electrodes measuring resistance are used because this is relatively non-invasive and easy for one to attach before going to bed. Besides electrical resistance, other data and other sensors commonly used by sleep researchers to determine sleep stages of subjects can also be used, as is readily understood by one of ordinary skill in the art.

During sleep, physiological changes occur in the sleeper. These changes are well-known and documented. It is known, for example, that people have different stages of sleep including deep sleep and REM (rapid eye movement) sleep, during which dreams occur. At certain points in the sleep cycle, usually at the beginning and end of the REM cycle, there are "spikes" of activity. This has been observed as varying degrees of movement to a casual watcher, and during these events, the sleeper is practically awake. For a given individual, given similar circumstances, sleep positions, and the like, these moments of temporary wakefulness, are regular, and can, to some degree, be predicted. If a person is roused or disturbed at one of these points, in many cases, they will be completely alert and unaware of actually having been asleep. The "spikes," which are referred to as optimal wake up points, can be detected through changes in the resistance sensed by the sensor 395. In this embodiment, the processor 220 not only selects the audible mode of the alert device when the user 110 is determined to be awake but also selects the audible alert mode when one of the optimal wake-up points is reached. In other words, the communication device 130 judges whether the user 110 is awake or in a light state of sleep and selects the audible alert mode if the user 110 is awake or in a light state of sleep.

In particular, signals representing the electrical resistance of the user 110 are sent to the processor 220 by the activity monitoring device 120. It has been determined that a sharp drop in resistance occurs at the optimal wake up times. Thus, the processor 220 is programmed to look at the electrical resistance of the user 110 at intervals of, for example, every three seconds and to review, for example, the previous thirty seconds for trend information. The amount of change in the resistance value at each three second interval over the previous thirty second period is stored and compared to a predetermined value, which is a threshold for determining whether to select the audible alert mode of the communication device 130. For example, if a 5% change or greater occurs in the resistance over the previous thirty second period, the processor 220 selects the audible alert mode of the alert device 275. The sample times and intervals can be adjusted according to the user 110 to achieve optimal results. Further, other known methods of detecting spikes in data can be employed with equal effect. In addition, further computer analysis of the spikes may be performed to determine whether a given spike indicates a period of light sleep. The processor 220 may be programmed such that, after a certain time period, the processor 220 again selects the silent alert mode as long as the user 110 is determined to be asleep. Therefore, if the user 110 is determined to be awake or in a light state of sleep, the audible alert mode will be selected, and the communication device 130 will produce an audible sound if an incoming call is received.

FIG. 7 shows the method just described in more detail. The routine of FIG. 7 can be stored in the memory 230 of FIG. 3 as an alert determination subroutine 236. Initially, at an operation 710, the electrical resistance of the user 110 is sensed at short intervals (three second intervals in this embodiment). The resistance signals are transmitted to the short-range receiver 392 by the short-range transmitter 394 of the activity monitoring device 120, and the signals for a period of time during which trends will be observed (thirty seconds in this embodiment) are read and stored by the processor 220. In a subsequent operation 712, the processor 220 determines the rate of change of the resistance over the previous thirty second period. This is a matter of determining the slope of a line between data points, which is well understood by those of ordinary skill in the art. In a decision 714, it is determined whether the rate of change of resistance is less than a predetermined rate (5% in this embodiment). If the outcome is positive, the user 110 is determined to be asleep, or in a first state, at 718, and the first alert mode, or a silent alert mode, is selected. If the outcome is negative, then a spike in the user's electrical resistance has been detected and, at 716, the user 110 is considered to be awake or in a light state of sleep, or in a second state, and the second alert mode, or the audible alert mode, is selected.

The apparatus and methods discussed above and the inventive principles thereof are intended to and will alleviate problems with conventional wireless communication units. Using these principles of selecting an appropriate alert mode of a communication device will contribute to user satisfaction. It is expected that one of ordinary skill given the above described principles, concepts and examples will be able to implement other alternative procedures and constructions that offer the same benefits. It is anticipated that the claims below cover many such other examples. For example, methods and devices other than those specifically mentioned for detecting biometric characteristics of a user 110. Many such sensors, including a sensor that detects motion with light reflecting from the user 110, can be employed with equal effect. Many such sensors are known in the art of sleep research and the art of monitoring sleeping infants or hospital patients can be employed with the same effect as those specifically mentioned.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication apparatus comprising:
   a controller;
   a receiver coupled to the controller,
   an alert device that is coupled to the controller, wherein the alert device alerts a user that the receiver has received a communication, and the alert device has a plurality of operating modes; and
   a biometric monitoring device, which is coupled to the controller, the biometric monitoring device configured to sense a biometric characteristic of the user, wherein the controller selects one of the operating modes of the alert device based on a biometric characteristic of the user, wherein one of the operating modes of the alert device is a non-disturbing mode in which the alert device is disabled, and the controller determines whether the user is in a predetermined state based on the biometric characteristic, and the controller selects the non-disturbing mode of the alert device when the user is in the predetermined state.

2. A communication apparatus according to claim 1, wherein one of the operating modes of the alert device is an audible mode in which the alert device audibly alerts the user that the receiver has received a communication, and the predetermined state is a first predetermined state, and the controller determines whether the user is in a second predetermined state based on the biometric characteristic, and the controller selects the audible mode when the user is in the second predetermined state.

3. A communication apparatus according to claim 1, wherein the biometric monitoring device comprises a motion detector that detects motion of the user.

4. A communication apparatus according to claim 3, wherein the controller determines an activity level of the user according to the degree of motion detected by the motion detector.

5. A communication device comprising:
- a controller;
- an alert device that is coupled to the controller, wherein the alert device alerts a user to an incoming message, and the alert device has a plurality of operating modes; and
- a short-range receiver coupled to the controller, wherein the short-range receiver receives signals that represent a biometric characteristic of a user and represent motion of the user, and the controller selects one of the operating modes of the alert device based on the biometric characteristic of the user.

6. A communication device according to claim 5, wherein one of the operating modes of the alert device is a silent mode in which the alert device is disabled, and the controller determines whether the user is in a predetermined state based on the biometric characteristic, and the controller selects the silent mode of the alert device when the user is in the predetermined state.

7. A communication device according to claim 6, wherein one of the operating modes of the alert device is an audible mode in which the alert device audibly alerts the user that the communication device has received a communication, and the predetermined state is a first predetermined state, and the controller determines whether the user is in a second predetermined state based on the biometric characteristic, and the controller selects the audible mode when the user is in the second predetermined state.

8. A communication device according to claim 5, wherein the controller determines the activity level of the user according to a degree of motion represented by the signals.

9. A communication device according to claim 5, wherein the device is coupled to a short-range transmitter via the short range receiver, which is coupled to a sensor, wherein the sensor produces the signals, and the short-range transmitter transmits the signals to the short-range receiver.

10. A method for selecting an alert device mode of a communication device based on a biometric characteristic of a user, the method comprising:
- sensing the biometric characteristic and motion of the user;
- determining a state of the user based on the biometric characteristic; and
- selecting an alert mode of the communication device based on the state of the user.

11. A method according to claim 10, wherein the method further comprises:
- determining whether the user is in a predetermined state based on the biometric characteristic; and
- selecting a non-disturbing alert mode of the communication device when the user is in the predetermined state.

12. A method according to claim 11, wherein the method further comprises selecting an audible alert mode of the alert device when the user is not determined to be in the predetermined state.

13. A method according to claim 10, wherein the method includes determining an activity level of the user according to a degree of motion of the user.

14. A method according to claim 10, wherein the method further comprises wirelessly transmitting signals that represent the biometric characteristic of the user from a remote biometric monitoring device to the communication device.

15. A method according to claim 10, wherein the method further comprises judging whether the user is asleep based on the biometric characteristic and selecting a non-disturbing alert mode of the communication device if the user is judged to be asleep.

16. A method according to claim 10, wherein the method further comprises judging whether the user is at least one of awake and in a light state of sleep and selecting an audible alert mode if the user is at least one of awake and in a light state of sleep.

17. A method according to claim 10, wherein the communication device is a wireless communication device and the method includes receiving a wireless communication.

18. A communication device comprising:
- a controller;
- an alert device that is coupled to the controller, wherein the alert device alerts a user to an incoming message, and the alert device has a plurality of operating modes; and
- a short-range receiver coupled to the controller, wherein the short-range receiver receives signals that represent motion of the user, and the controller selects one of the operating modes of the alert device based on the motion of the user.

19. A communication device according to claim 18 wherein the controller determines whether the user is in a predetermined state based on the signals including a biometric characteristic; and selects a non-disturbing alert mode of the communication device when the user is in the predetermined state.

* * * * *